(12) United States Patent
Garg et al.

(10) Patent No.: US 7,003,569 B2
(45) Date of Patent: Feb. 21, 2006

(54) FOLLOW-UP NOTIFICATION OF AVAILABILITY OF REQUESTED APPLICATION SERVICE AND BANDWIDTH BETWEEN CLIENT(S) AND SERVER(S) OVER ANY NETWORK

(75) Inventors: Gopal K. Garg, Milpitas, CA (US); Pankai K. Jha, Fremont, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 762 days.

(21) Appl. No.: 09/812,505

(22) Filed: Mar. 20, 2001

(65) Prior Publication Data

US 2002/0138613 A1   Sep. 26, 2002

(51) Int. Cl.
*G06F 15/173*   (2006.01)
*G06F 11/00*   (2006.01)

(52) U.S. Cl. ............................ 709/225; 709/223; 714/4

(58) Field of Classification Search ................ 709/225, 709/224, 205, 220–223; 718/105; 707/10, 707/205; 714/4; 370/382
See application file for complete search history.

(56) References Cited

U.S. PATENT DOCUMENTS

| | | | | |
|---|---|---|---|---|
| 5,835,765 A | * | 11/1998 | Matsumoto ................. | 718/102 |
| 6,148,337 A | * | 11/2000 | Estberg et al. .............. | 709/224 |
| 6,249,800 B1 | * | 6/2001 | Aman et al. ................ | 718/105 |
| 6,332,161 B1 | * | 12/2001 | Sasson ....................... | 709/227 |
| 6,389,028 B1 | * | 5/2002 | Bondarenko et al. ....... | 370/401 |
| 6,507,870 B1 | * | 1/2003 | Yokell et al. ................ | 709/225 |
| 6,516,350 B1 | * | 2/2003 | Lumelsky et al. .......... | 709/226 |
| 6,658,255 B1 | * | 12/2003 | Goss et al. ................. | 455/450 |
| 6,728,887 B1 | * | 4/2004 | Dziekan et al. ............. | 713/201 |
| 6,771,766 B1 | * | 8/2004 | Shafiee et al. ......... | 379/265.09 |
| 6,785,768 B1 | * | 8/2004 | Peters et al. ................ | 711/112 |
| 6,801,543 B1 | * | 10/2004 | Ployer ........................ | 370/468 |
| 6,816,904 B1 | * | 11/2004 | Ludwig et al. ............. | 709/226 |
| 6,829,643 B1 | * | 12/2004 | Tobe et al. ................. | 709/226 |
| 2002/0032775 A1 | * | 3/2002 | Venkataramaiah et al. .. | 709/225 |
| 2002/0133593 A1 | * | 9/2002 | Johnson et al. ............. | 709/226 |
| 2002/0152305 A1 | * | 10/2002 | Jackson et al. ............. | 709/224 |
| 2005/0120040 A1 | * | 6/2005 | Williams et al. ............ | 707/102 |

FOREIGN PATENT DOCUMENTS

EP           859492 A2  *  8/1998

OTHER PUBLICATIONS

Smith, W. et al., "Using run-time predictions to estimate queue wait times and improve scheduler performance", Job Schdeuling Strategies for Parallel Processing, IPPS/SPDP'99, p 202-219, Apr. 1999.*
West, R. et al., "Dynamic window-constrained scheduling for multimedia applications", IEEE Intern. Conf. on Multimedia Computing and Systems, v 2, p 87-91, Jun. 1999.*
Fang, W. et al., "A time sliding window three colour marker (TSWTCM)", RFC 2859, p 1-9, Jun. 2000.*

* cited by examiner

Primary Examiner—Jason D Cardone
(74) Attorney, Agent, or Firm—Christopher P. Maiorana, P.C.

(57) ABSTRACT

A method for providing orderly service delivery to clients over a network, comprising the steps of (A) requesting data from a location and (B) if a denial is received, notifying a particular client of availability.

20 Claims, 3 Drawing Sheets

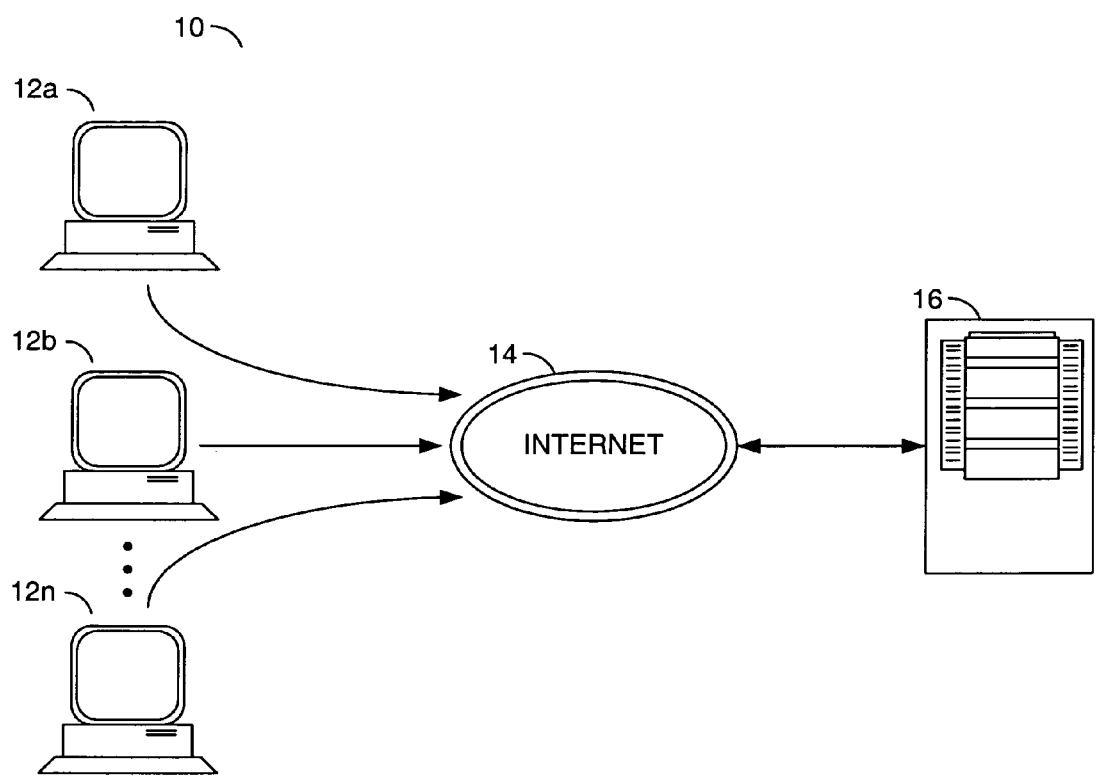
CONVENTIONAL
FIG. 1

FOLLOW-UP NOTIFICATION OF AVAILABILITY OF REQUESTED APPLICATION SERVICE AND BANDWIDTH BETWEEN CLIENT(S) AND SERVER(S) OVER ANY NETWORK

FIELD OF THE INVENTION

The present invention relates to a method and/or architecture for requests of data over a network generally and, more particularly, to a method and/or architecture for controlling service and bandwidth between client and server systems.

BACKGROUND OF THE INVENTION

Over an internet, network computers or network devices (i.e., clients) issue requests for applications such as multimedia real-time download, large file transfer, or interactive sessions that are placed with another computer (i.e., server). For example, a request from a client can be made for a video broadcast from a CNN server. Such video transfers require sustained availability of bandwidth for the duration of transfer. Since client requests are independent of each other, many client requests line up at the server at peak hours of operation. When the server capacity or the network capacity is exceeded, any further client requests result in a denial of service (DOS). In such a case, clients either usually back off and try again later, or give up on the request entirely. In either case, while existing clients are being timed out, new clients are likely to request the same resources independent of each other. The new requests will further add to previous requests and retries. Persistent requests keep the server and network bandwidth fully loaded and on the verge of breakdown. The network can breakdown at the server or any other point along the network.

Referring to FIG. 1, a conventional internet system 10 is shown. The system 10 includes a number of clients 12a–12n, an internet backbone portion 14 and a server 16. The system 10 illustrates a conventional internet sequence of events for network access. The clients 12a–12n request information from the server 16. If the server 16 reaches capacity and denies connection, bandwidth issues result. The denied clients 12a–12n can wait a period of time and return to the server 16 later or give up entirely.

The clients 12a–12n are not informed of the level of network congestion, or the number of requests already pending at the server 16. All requests and retries come asynchronously and are not efficiently handled by the system 10.

The server 16 is never able to surpass a maximum bandwidth usage level, since new requests constantly back up. Network and service providers must then plan for a worst case need of bandwidth. The conventional internet system 10 does not provide for orderly delivery of bandwidth among subscribers and results in expensive network resources between the server 16 and the clients 12a–12n for installation and operation.

Conventional methods have been proposed to solve bandwidth bottleneck issues. One such method, connection admission control (CAC), employs admission and reservation granted in advance. The server then refuses to allow any newer client entry. Interconnected with the CAC is a method for network bandwidth management, resource reservation protocol (RSVP). The RSVP method reserves network traffic bandwidth at all the nodes between a client and a server. However, CAC with or without RSVP, is asynchronous to incoming client requests. The bandwidth becomes unmanageable, since new clients have no information about network loading.

It is generally desirable to provide a cost effective system for reducing network congestion configured to handle numerous requests.

SUMMARY OF THE INVENTION

The present invention concerns a method for providing orderly service delivery to clients over a network, comprising the steps of (A) requesting data from a location and (B) if a denial is received, notifying a particular client of availability.

The objects, features and advantages of the present invention include providing a method and/or architecture for controlling service and bandwidth on a network that may (i) provide orderly service delivery to client machines that request a service, (ii) distribute available resources of a server and network among many systems that require service, (iii) reduce network and system operator costs, and/or (iv) possibly reduce required investment in servers and network infrastructure.

BRIEF DESCRIPTION OF THE DRAWINGS

These and other objects, features and advantages of the present invention will be apparent from the following detailed description and the appended claims and drawings in which:

FIG. 1 is a block diagram illustrating a conventional network service access;

DETAILED DESCRIPTION OF THE PREFERRED EMBODIMENTS

Figure 2:
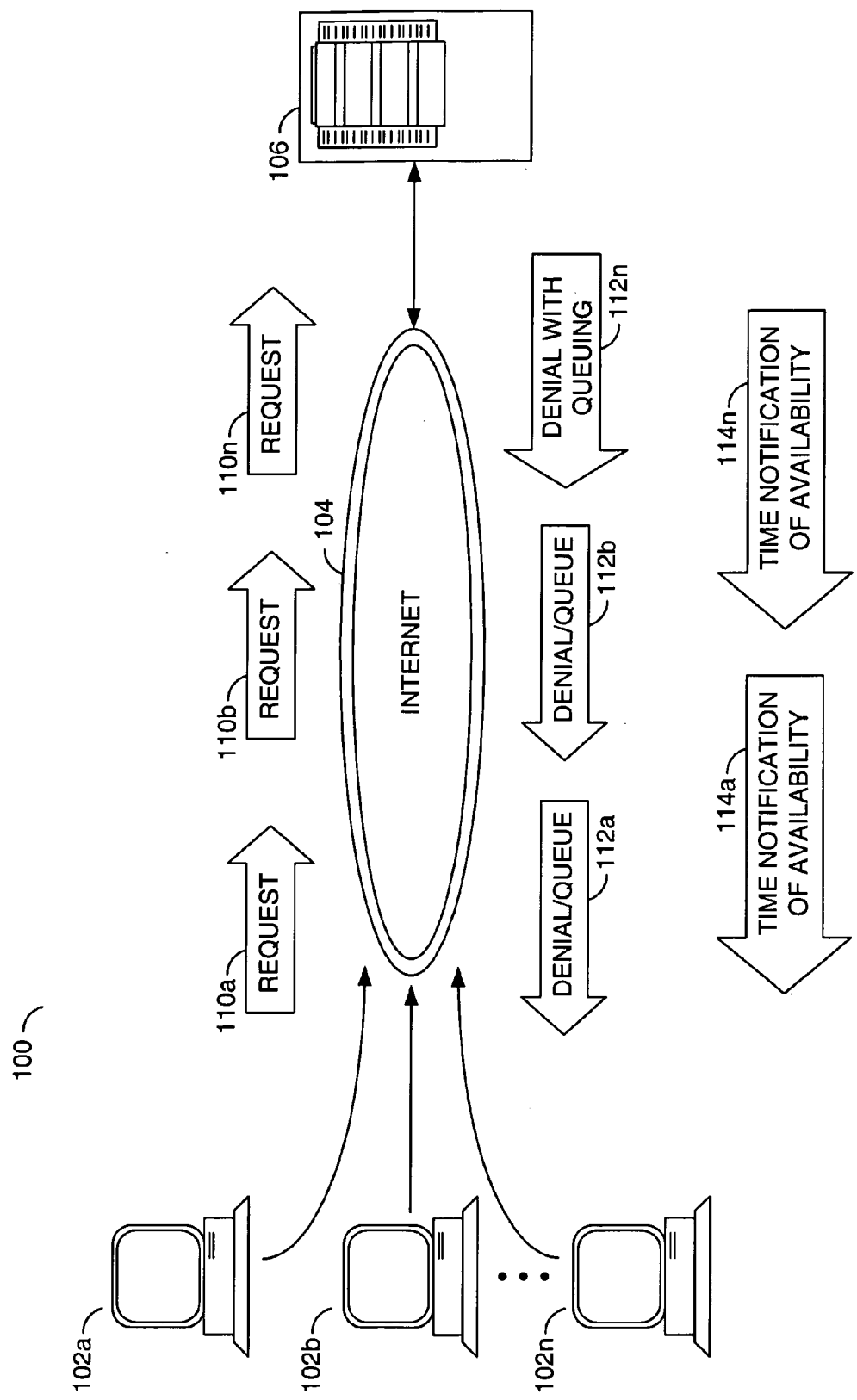
FIG. 2 is a block diagram of a preferred embodiment of the present invention.

Referring to FIG. 2, a block diagram of system (or circuit) 100 is shown in accordance with a preferred embodiment of the present invention. The system 100 may solve service and bandwidth exhaustion concerns between client and server systems across a network. The system 100 may streamline queued service and bandwidth requests to prevent excessive and persistent bandwidth exhaustion of a server providing the requested service.

The system 100 may be an internet system or other appropriate type network. The system 100 generally comprises a number of nodes 102a–102n, a network portion 104 and a node 106. In one example, the nodes 102a–102n may be implemented as clients and the node 106 may be implemented as a server. The clients 102a–102n may communicate with the server 106 through the network portion 104. The network portion 106 may be implemented as an internet system comprising either a public network or an internal enterprise network.

The clients 102a–110n may place a request 110a–110n with the server 106 over the internet 104. The server 106 may issue denial of service with queuing indications 112a–112n to the clients 102a–110n. The server 106 may further issue time notification of availability indications 114a–114n to the clients 102a–110n. The requests 110a–110n may be implemented as information requests, application requests, data requests, or other appropriate type requests. In one example, the denial with queuing indications 112a–112n may include the time notification of availability indications 114a–114n. The requests 110a–110n, the denials 112a–112n and the notifications 114a–114n may be implemented as indications, responses, notifications or other appropriate type signals. The request 110a may request a multimedia real-time download, a large file transfer, or an interactive session. After the request 110a reaches the server 106, the server 106 may respond to the request 110a. If an appropriate bandwidth is available, the server 106 may return the requested information. However, if the required bandwidth is not available, the server 106 may issue the denial with queuing 112a. The denial with queuing 112a may be returned to the client 102a requesting information;

A number of users (e.g., the clients 102a–102n) may request (e.g., the request 110a) a particular service, such as a video broadcast from a particular server (e.g., the server 106). Video transfers generally require sustained availability of bandwidth for the duration of transfer. Since the client requests 110a–110n are independent of each other, many such client requests may line up at the server 106 in peak hours of operation. When the server capacity or the network capacity is exceeded, any further client requests result in a denial of service (DOS). When a DOS occurs, the clients 102a–102n either back off and try again later or give up on the request. In either case, while the existing clients 102a–102n are being timed out, additional clients are likely to request the same resources independently of each other.

If a particular client (e.g., the client 102a) agrees, the server 106 may collect one or more of the following pieces of information from the client (i) a web address of the client machine and (ii) client network reachability information. The server 106 may then queue an internal service request list of the client 102n. The server 106 may then schedule service to all the pending client requests in an orderly fashion, to conserve bandwidth and server resources. Additionally, the server 106 may provide a running timer countdown value to the client 102a. The countdown value may allow the client 102a to determine a time delay for available service. Thus, preventing backlogs due to repeated retries.

The system 100 may queue and streamline the requests 110a–110n during bandwidth congestion such that the clients 102a–102n back off gracefully and are notified with the time notification of availability 114a–114n. The system 100 may grant bandwidth to the clients 102a–102n in a sustained and orderly methodology. The network 100 may avoid major traffic backlogs that may result in shutdown or failure.

Figure 3:
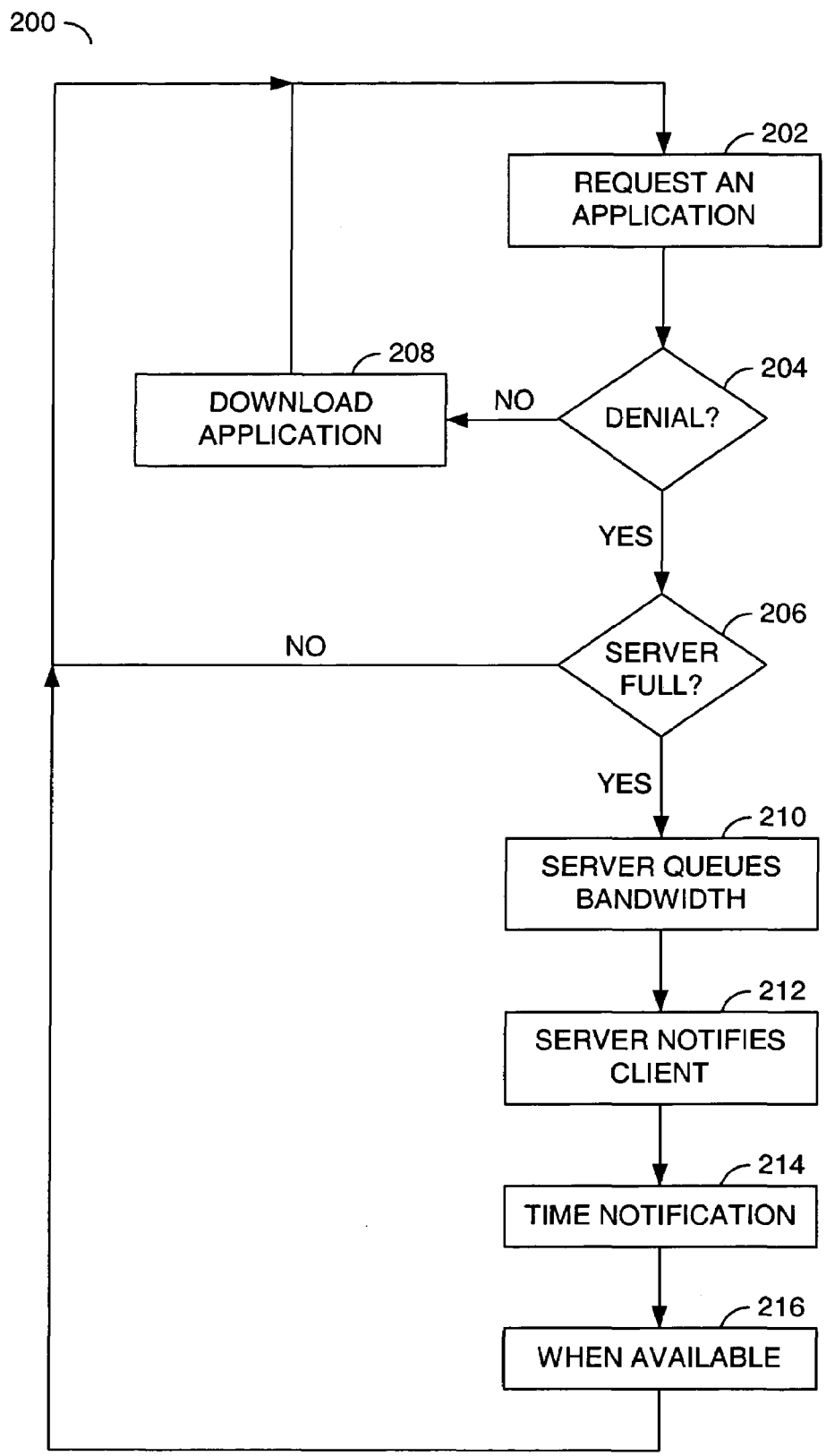
FIG. 3 is a flow chart illustrating an operation of the present invention.

Referring to FIG. 3, a method (or process) 200 is shown in accordance with the present invention. The method 200 may illustrate an operation of the system 100. The process 200 generally comprises a state 202, a decision state 204, a decision state 206, a state 208, a state 210, a state 212, a state 214 and a state 216. The state 202 generally receives a request. The decision state 204 may determine if the request from the state 202 has been denied. If the request has not been denied, the method 200 may move to the state 208 where the application is downloaded. If the request has been denied, the process 200 may move to the state 206. The decision state 206 may determine if the server is full. If the server is not full, the process 200 may return to the state 202. If the server is full, the process 200 may move to the state 210. The state 210 may queue a particular bandwidth of the server. Next, in the state 212, the server may notify the client. The server may notify the client with a denial of service with queuing notification. Next, in the state 214, a time notification is generated and sent to the client. Next, the state 216 may determine when the server is available. The method 200 may illustrate an internet sequence of events for network access.

At the state 202, the process 200 may allow the clients to request an application. At the state 204, the process 200 may deny connection if the network reaches capacity. At the state 206, the process 200 may indicate if the server reaches capacity. The states 210–216 generally provide orderly bandwidth delivery with a follow-up notification (FUN) scheme. At the state 210, the process 200 may allow the server to queue a required bandwidth. An alternative embodiment of the present invention may allow for indication of required software bandwidth parameters for a particular application. At the state 212, the process 200 may allow the server to notify a client that service is unavailable and that the client will be notified later of availability. At the state 214, the process 200 may allow the server to send a notification (e.g., a running timer countdown value) with a response time window for the client. At the state 216, the process 200 may allow the server to indicate when bandwidth is available.

The method 200 may allow bandwidth to be reserved for the clients 102a–110n during a response time window. The method 200 may also depend on a particular number of the clients 102a–110n. Therefore, the server 106 may plan ordered delivery of bandwidth to the clients 102a–110n. After receiving a request from a client 102a, the server 106 may service the request 110a if bandwidth and system resources are available. If the bandwidth and resources are not available, the server 106 may query the client 102a to determine if the client 102a may be willing to receive service at a later time. The method 200 may hold client information (if so desired by the client) and then provide an orderly delivery of information to all pending requests from the clients 102a–110n.

The server 106 may query the clients 102a–102n to determine if the client 102a–102n would be willing to receive service at a later time. If the client agrees, the server 106 may collect information from the client such as (i) a web address of the client machine, (ii) client network reachability information, and (iii) time limits (if any) within which the client is willing to receive service again. The information collected by the server may be varied in order to meet the criteria of a particular implementation. The server 106 may further queue the client request in an internal service request list. At a later time, the server 106 may then schedule service to all pending client requests in an orderly fashion, to conserve bandwidth and server resources. The system 100 may allow server and client systems and interconnecting networks to efficiently utilize available resources.

Typical network systems have to plan for worst case performance expectations. Furthermore, demand for server resources and applications peaks at particular times. In such a case, the network and server bandwidth is congested and cannot keep up with demand. To avoid outages, companies have upgraded systems at high expenses. The system 100 may allow servers to determine if clients would be willing to receive desired service at a later time. The system 100 may also notify such clients of availability. Thus, the system 100 may provide savings on equipment, infrastructure and management of the infrastructure. In addition to savings in equipment and network infrastructure, the system 100 may provide a way to evenly distribute bandwidth requests over a period of time. Therefore, the system 100 may also prevent bandwidth outages.

The system 100 may request queuing by the server 106 and a recording of a particular client identity. The system 100 may implement follow-up notification of services to clients that previously requested service. The system 100 may provide orderly delivery of services depending on a number of requests and amount of time acceptable to the clients 102a–102n. The system 100 may provide orderly service delivery to the clients 102a–102n that request a service. The system 100 may easily distribute available resources of the server and network among many systems that require service. The system 100 may also reduce costs for network and system operators to construct networks and servers for an unknown level of demand. Therefore, the system 100 may reduce investment in servers and network infrastructure. Additionally, the system 100 may allow for network and system operators to prepare for load levels at high service demand times.

The function performed by the flow diagram of FIG. 3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A method for providing evenly distributed bandwidth requests between one or more clients and a server over a network, comprising the steps of:
    (A) requesting data from a location on said server by one of said clients;
    (B) if said data is available, transferring said data to said client;
    (C) if said data is unavailable, issuing a denial of service indication along with a queuing indication for notifying said client of a particular time window of availability of said data; and
    (D) requesting said data from said server during said time window.

2. The method according to claim 1, further comprising the step of:
    distributing available resources of the network between said clients by evenly distributing said time windows over a period of time.

3. The method according to claim 2, further comprising the step of:
    distributing available resources of said server between said clients by evenly distributing said time windows over a period of time.

4. The method according to claim 1, further comprising: prior to step (C), determining if the particular client is willing to receive service at a later time.

5. The method according to claim 4, wherein said client indicates an availability to receive service at a later time.

6. The method according to claim 1, wherein step (C) further comprises:
    requesting information from said client to provide service.

7. The method according to claim 6, wherein said information comprises (i) a network location, (ii) reachability information and (iii) time constraints.

8. The method according to claim 1, wherein step (B) further comprises:
    determining a network failure condition.

9. The method according to claim 1, wherein step (C) further comprises:
    determining a server status prior to notifying said client of said time window.

10. The method according to claim 1, wherein step (C) further comprises:
    presenting bandwidth requirement information as part of said queuing indication.

11. The method according to claim 1, wherein step (C) further comprises:
    determining a configuration of said particular client.

12. An apparatus comprising:
    means for requesting data from a location on a server by one or a plurality of clients;
    means for sending data to said client if said data is available;
    means for notifying a particular client if said data is unavailable, wherein said notification includes a queuing indication for notifying said particular client of a particular time window of availability; and
    means for requesting said data from said server during said time window.

13. An apparatus comprising:
    a server configured to provide evenly distributed bandwidth requests to a number of clients each configured to request data from said server, over a network;
    a control circuit configured to notify a particular client if said data is unavailable, wherein said notification includes a queuing indication for notifying said client of a particular time window of availability; and
    means for requesting said data from said server during said time window.

14. The apparatus according to claim 13, wherein said apparatus is further configured to evenly distribute available resources of said server and said network.

15. The apparatus according to claim 13, wherein said apparatus is further configured to determine a failure condition of said network.

16. The apparatus according to claim 13, wherein said apparatus is further configured to determine a status of said server.

17. The apparatus according to claim 13, wherein said apparatus is further configured to determine bandwidth requirement information of said network.

18. The apparatus according to claim 13, wherein said apparatus is further configured to notify said number of clients.

19. The apparatus according to claim 13, wherein said apparatus is further configured to indicate an availability of said server.

20. The apparatus according to claim 13, wherein said apparatus is further configured to determine a configuration of a particular client.

* * * * *